(12) United States Patent
Chen et al.

(10) Patent No.: US 10,262,410 B2
(45) Date of Patent: Apr. 16, 2019

(54) METHODS AND SYSTEMS FOR INSPECTING GOODS

(71) Applicant: NUCTECH COMPANY LIMITED, Beijing (CN)

(72) Inventors: Zhiqiang Chen, Beijing (CN); Li Zhang, Beijing (CN); Ziran Zhao, Beijing (CN); Yaohong Liu, Beijing (CN); Cun Cheng, Beijing (CN); Qiang Li, Beijing (CN); Jianping Gu, Beijing (CN); Jian Zhang, Beijing (CN); Gang Fu, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 219 days.

(21) Appl. No.: 15/279,664

(22) Filed: Sep. 29, 2016

(65) Prior Publication Data

US 2017/0140526 A1    May 18, 2017

(30) Foreign Application Priority Data

Nov. 18, 2015    (CN) .......................... 2015 1 0795436

(51) Int. Cl.
*G06T 7/00* (2017.01)
*G06K 9/00* (2006.01)
(Continued)

(52) U.S. Cl.
CPC ........ *G06T 7/0008* (2013.01); *G06K 9/00771* (2013.01); *G06K 9/3233* (2013.01);
(Continued)

(58) Field of Classification Search
CPC combination set(s) only.
See application file for complete search history.

(56) References Cited

U.S. PATENT DOCUMENTS

| 6,463,419 B1 * | 10/2002 | Kluss ..................... G06Q 10/08 705/330 |
| 2003/0229615 A1 | 12/2003 | Yamauchi et al. |

(Continued)

FOREIGN PATENT DOCUMENTS

| JP | 2003-323522 A | 11/2003 |
| JP | 2014-525594 A | 9/2014 |
| JP | 2014-526755 A | 10/2014 |

OTHER PUBLICATIONS

Office Action issued in corresponding Japanese Patent Application No. 2016-190849, dated Apr. 24, 2018.
(Continued)

*Primary Examiner* — Iman K Kholdebarin
(74) *Attorney, Agent, or Firm* — Morgan, Lewis & Bockius LLP

(57) ABSTRACT

The present disclosure provides a method and a system for inspecting goods. The method includes the steps of: obtaining a transmission image and a HSCODE of inspected goods; processing the transmission image to obtain a region of interest; retrieving from a model library a model created based on the HSCODE, in accordance with the HSCODE of the inspected goods; and determining whether there are any goods not registered in a customs declaration that are contained in the region of interest based on the model. With the above solution, it is possible to inspect goods in a container efficiently, so as to find out whether there are goods not indicated in the customs declaration that are concealed in the container.

11 Claims, 3 Drawing Sheets

(51) Int. Cl.
*G06K 9/46* (2006.01)
*G06Q 30/00* (2012.01)
*G06K 9/32* (2006.01)
*G06T 7/11* (2017.01)
*G06K 9/18* (2006.01)
*G06K 9/62* (2006.01)
*G06T 7/136* (2017.01)

(52) U.S. Cl.
CPC ......... *G06K 9/4604* (2013.01); *G06K 9/4671* (2013.01); *G06Q 30/018* (2013.01); *G06T 7/11* (2017.01); *G06K 9/18* (2013.01); *G06K 9/6215* (2013.01); *G06K 2209/09* (2013.01); *G06T 7/136* (2017.01); *G06T 2207/10116* (2013.01)

(56) References Cited

U.S. PATENT DOCUMENTS

| | | | |
|---|---|---|---|
| 2008/0231459 A1* | 9/2008 | Corder | G07C 5/008 340/572.7 |
| 2009/0129544 A1* | 5/2009 | Chen | G01N 23/04 378/62 |
| 2013/0101172 A1 | 4/2013 | Parikh et al. | |
| 2014/0226877 A1 | 8/2014 | Je et al. | |
| 2015/0010128 A1* | 1/2015 | Drouin | G01N 23/046 378/57 |
| 2015/0189239 A1 | 7/2015 | Zhao et al. | |
| 2016/0189360 A1* | 6/2016 | Kang | G06T 7/0004 378/57 |
| 2017/0242148 A1* | 8/2017 | Yu | G01F 17/00 |
| 2017/0278281 A1* | 9/2017 | Schmitt | G06T 7/0012 |
| 2017/0299765 A1* | 10/2017 | Parikh | G06T 7/0004 |
| 2018/0150951 A1* | 5/2018 | Chen | G06K 9/46 |
| 2018/0157932 A1* | 6/2018 | Gu | G06K 9/6227 |

OTHER PUBLICATIONS

Tuszynski et al., "A method for automatic manifest verification of container cargo using radiography images", Journal of Transportation Security, vol. 6, No. 4, pp. 339-356, Jul. 20, 2013.

Zhang et al., "Joint Shape and Texture Based X-Ray Cargo Image Classification", 2014 IEEE Conference on Computer Vision and Pattern Recognition Workshops, IEEE, pp. 266-273, Jun. 23, 2014.

Leung et al., "Representing and Recognizing the Visual Appearance of Materials using Three-dimensional Textons", International Journal of Computer Vision, pp. 29-44, Jun. 2001.

Extended European Search Report issued in corresponding European Patent Application No. 16191107.8 dated Apr. 6, 2017.

Office Action issued in corresponding Japanese Patent Application No. 2016-190849, dated Nov. 7, 2017.

Preliminary Rejection dated Aug. 16, 2017 for corresponding Korean Application No. 10-2016-0126366.

* cited by examiner

METHODS AND SYSTEMS FOR INSPECTING GOODS

TECHNICAL FIELD

The present disclosure relates to security inspection by radiation imaging, and more particularly, to automatic inspection of containers to determine where there is a false or concealed declaration.

BACKGROUND

Intelligent inspection has become a hot spot in the development of security inspection. Currently, as the Internet technology has become widely popular and the cloud computing has been applied to various industries, intelligent security inspection has attracted more and more attention of customs globally. The intelligent security inspection can not only provide clients with faster and more convenient services and improved security inspection efficiency, but also offer more valuable information to customs inspectors while achieving an enhanced seizure rate, and is thus currently one of major approaches for vendors to increase values of their products. One of such intelligent schemes is to use customs declaration/manifest data (referred to as customs declaration hereinafter) and perform an image-declaration comparison by means of image processing and semantic interpretation, so as to find out false or concealed declarations.

However, since the development of this technique is still at its initial phase, the schemes are not mature and the algorithms or software systems cannot fully satisfy users' requirements. For example, it has been proposed to use customs declaration information and perform comparison with the customs declaration by means of image matching. However, this technique is too idealistic and has poor effects in practice. It is difficult to be applied to situations where there are severe non-rigid deformations or perspective superimpositions in perspective images. It is also difficult to be applied to real-time processing of a large number of categories. Further, with big-data inference, image classification algorithms can be used for analyzing and comparing customs declarations. However, this solution has a limited effect when there are a large number of categories.

Therefore, the effects of the conventional solutions for customs declaration comparison algorithms may depend on various factors, such as a larger number of categories, regional differences between categories, self-learning for new categories, a large difference within a category, a difference between performances of different devices, and discrimination between image regions when multiple goods are contained in one container and when there is a perspective overlap. The conventional solutions do not consider these factors and thus cannot satisfy user's requirements in practice.

SUMMARY

In view of the one or more problems in the prior art, the present disclosure provides a method and a system for inspecting goods.

According to an aspect of the present disclosure, a method for inspecting goods is provided. The method comprises steps of: obtaining a transmission image and a HSCODE of inspected goods; processing the transmission image to obtain a region of interest; retrieving from a model library a model created based on the HSCODE, in accordance with the HSCODE of the inspected goods; and determining whether there are any goods not registered in a customs declaration that are contained in the region of interest based on the model.

Preferably, the step of processing the transmission image to obtain the region of interest comprises: applying a supervised image segmentation to the transmission image, with a category of goods represented by the HSCODE of the inspected goods as a supervision value, to obtain at least one segmented region as the region of interest.

Preferably, the step of determining whether there are any goods not registered in the customs declaration that are contained in the region of interest based on the model comprises: obtaining a texture description of each segmented region by applying a feature extraction to the segmented region, so as to form a feature vector; determining whether a similarity between the feature vector of each segmented region and respective templates included in the model is larger than a threshold; and determining that there are goods not registered in the customs declaration that are contained in the inspected goods when the similarity between the feature vector of at least one segmented region and the respective templates included in the model is not larger than the threshold.

Preferably, the step of retrieving from the model library the model created based on the HSCODE in accordance with the HSCODE of the inspected goods comprises: retrieving, from a local model library and/or a cloud model library, all models corresponding to front predetermined bits of the HSCODE.

Preferably, the method further comprises: sorting the retrieved models in an order; determining whether there are any goods not registered in the customs declaration that are contained in the region of interest in the order; and determining that there are goods not registered in the customs declaration that are contained in the inspected goods when the similarity between the feature vector of at least one segmented region and the templates of at least one of the models is not larger than the threshold.

Preferably, the method further comprises: updating all models corresponding to front predetermined bits of the HSCODE in a local model library and/or a cloud model library.

Preferably, the method further comprises: performing local region sampling at an edge of the image; and extracting a multi-scale frequency domain feature from sampling points. The feature vector is obtained from the multi-scale frequency domain feature.

Preferably, when the customs declaration does not include the HSCODE, the HSCODE of the goods is determined based on a name of goods indicated in the customs declaration.

Preferably, each template in each model comprises a feature vector. When the number of templates in the model is smaller than a predetermined number, a feature vector of a new sample is recorded directly as a template. When the number of templates in the model reaches the predetermined number, a feature vector of a new sample that matches the model is not used as a template, and a weight of the template having the highest similarity with the sample is increased. When a feature vector of a new sample does not match any template in the model, the template having the lowest weight is replaced with the feature vector of the new sample.

Preferably, the model comprises at least the following information: a device identifier, a HSCODE identifier, a maximum number of templates, respective templates, weights of the respective templates, unique identifiers of the respective templates in a historic image library, and a similarity threshold.

According to another aspect of the present disclosure, a system for inspecting goods is provided. The system comprises: a scanning device configured to obtain a transmission image and a HSCODE of inspected goods; and a data processing device configured to: process the transmission image to obtain a region of interest; retrieve from a model library a model created based on the HSCODE, in accordance with the HSCODE of the inspected goods; and determine whether there are any goods not registered in a customs declaration that are contained in the region of interest based on the model.

With the above solutions, it is possible to identify a region in an image of goods in a container that is inconsistent with a customs declaration data of the goods, such that this region can be considered to involve a false or concealed declaration.

BRIEF DESCRIPTION OF THE DRAWINGS

To understand the present disclosure in a better way, a detailed description of the present disclosure will be given with reference to the following drawings, in which.

Not all of the circuits or structures in the embodiments are shown in the figures. Throughout all the figures, the same reference signs are used to represent the same or similar components or features.

DETAILED DESCRIPTION

Specific embodiments of the present disclosure will be described in detail below. It should be noted that the embodiments herein are used for illustration only, without limiting the present disclosure. Hereinafter, to provide a thorough understanding of the present disclosure, numerous specific details are set forth. However, it would be obvious for one ordinarily skilled in the art that the present disclosure can be practiced without these specific details. In other examples, known structures, materials, or methods are not described in detail to avoid any possible obfuscation of the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" presented in various positions throughout the specification may not necessarily refer to the same embodiment or example. Furthermore, specific features, structures or properties may be combined into one or more embodiments or examples in any appropriate combination and/or sub-combination. Moreover, it should be understood for those skilled in the art that the term "and/or" used herein means any and all combinations of one or more listed items.

Figure 1A:
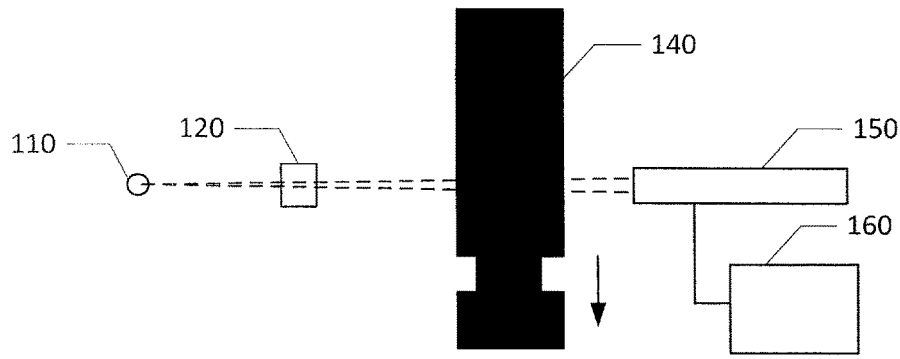
FIG. 1A and FIG. 1B are schematic diagrams each showing a system for inspecting goods according to an embodiment of the present disclosure.
Figure 1B:
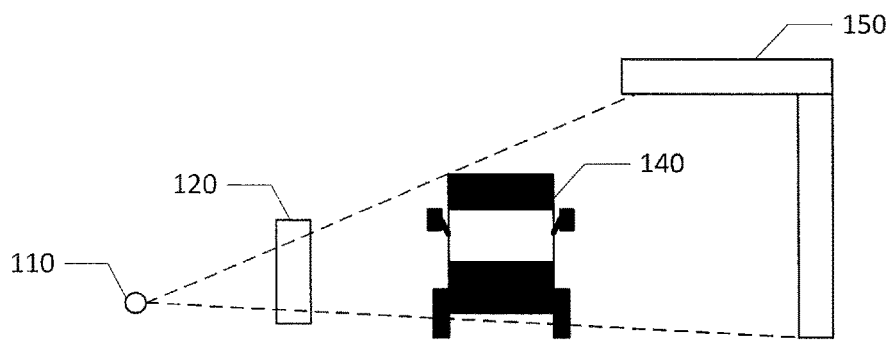

FIG. 1A and FIG. 1B are schematic diagrams each showing an inspection system according to an embodiment of the present disclosure. FIG. 1A shows a top view of the inspection system and FIG. 1B shows a front view of the inspection system. As shown in FIG. 1A and FIG. 1B, a radiation source 110 generates an X-ray, which is subjected to calibration by a calibrator 120 and then used for security inspection of a moving container truck 140. The ray penetrates the truck and is received by a detector 150. The resulting transmission image is processed by a data processing apparatus 160, such as a computer.

According to an embodiment of the present disclosure, once the transmission image of the container truck 140 has been obtained by means of scanning, it is processed by the data processing apparatus 160 to obtain a region of interest. In accordance with the HSCODE of the inspected goods, a model created based on the HSCODE is retrieved from a model library. Then, it is determined whether there are any goods not registered in a customs declaration that are contained in the region of interest based on the model. In this way, it is possible to automatically inspect whether there is a false/concealed declaration for the goods in the container.

In the present disclosure, it is proposed to use the code in the Harmonization System, i.e., HSCODE, specified by Customs Cooperation Council as a unique identifier of goods for comparison. That is, a model is created for each HSCODE and contains a feature space for describing features of the image of the goods corresponding to the HSCODE. In some embodiments, in view of the multi-level, hierarchical structure of categories, those levels are modeled individually and a per-level matching policy is adopted for comparison. For example, a global HSCODE is a 6-digit code, with the subsequent digits to be defined by each country itself. In a HSCODE that is commonly used for imported/exported goods by China Customs in 2013, there are 6341 level-2 codes (8-digit) and 6735 level-3 codes (10-digit), i.e., 13076 codes in total. For the commonality, three layers of models, i.e., 6-digit, 8-digit and 10-digit, are created. As an example, for a 10-digit code "0123456789" of goods, a matching policy may be matching a 6-digit model "0123456", an 8-digit model "012345678" and a 10-digit model "01213456789", respectively, to solve the problems associated with a larger number of categories, regional differences between categories, and a large difference within a category.

Figure 2:
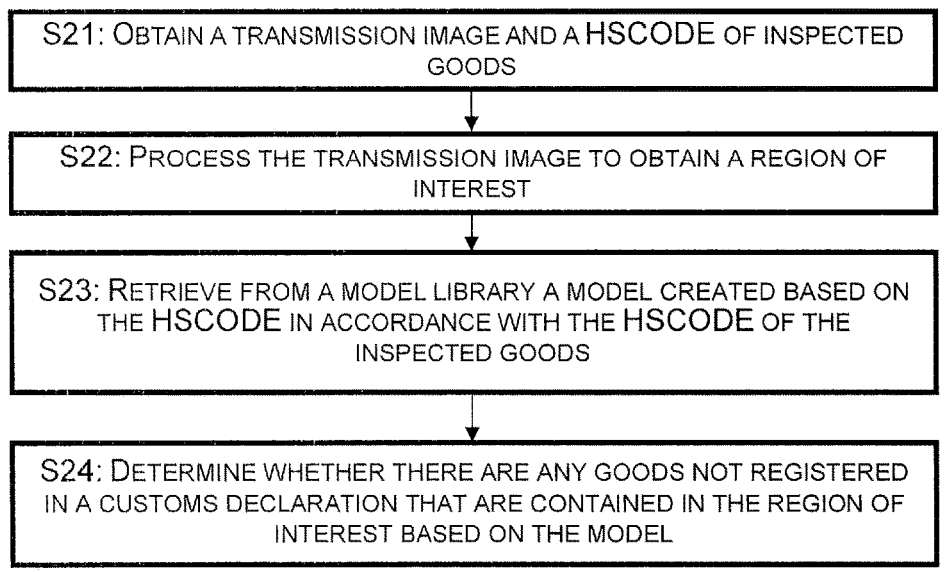
FIG. 2 is a flowchart illustrating a method for inspecting goods according to an embodiment of the present disclosure.

FIG. 2 is a flowchart illustrating a method for inspecting goods according to an embodiment of the present disclosure. As shown in FIG. 2, at step S21, a transmission image and a HSCODE of inspected goods are obtained. For example, a transmission image of an inspected container can be obtained using a scanning device as shown in FIG. 1A and FIG. 1B. The HSCODE can be obtained from a customs declaration. When the customs declaration does not include the HSCODE, the HSCODE of the goods is determined based on a name of the goods.

At step S22, the transmission image is processed to obtain a region of interest. For example, in order to extract a region of the goods and reduce influence of inconsistent physical characteristics of the device on the image as much as possible, first a normalization is achieved by applying image processing operations such as removing attenuations caused by background and air and removing row/column strips.

Then, the region of the goods can be obtained by performing operations such as binarization, edge extraction and container edge detection.

At step S23, in accordance with the HSCODE of the inspected goods, a model created based on the HSCODE is retrieved from a model library. At step S24, it is determined whether there are any goods not registered in a customs declaration that are contained in the region of interest based on the model.

In the present disclosure, it is proposed to solve the problem associated with the difference between devices by creating device-side models (local models) and cloud models. The cloud models originate from a computing center and are updated online to maintain the most complete categories of HSCODEs. However, it normalizes the difference between the devices and thus has a lower accuracy than the local models. The local models are generated at the device side after collecting a sufficient number of historic images and conform to the situations of the device, but have a smaller number of HSCODE categories than the cloud models. For a new device, it does not have any local model and can only use the cloud models. After collecting enough images and generating and training the device-side models, the local models, rather than the cloud models, are automatically selected for comparison. It is to be noted that the cloud models do not need to be used online. Rather, they can be offline and can be synchronized regularly.

Further, upon receiving a user instruction, a feature of an image to be analyzed can be updated to the local models and the cloud models, so as to achieve a self-learning function. Such updating may involve a newly generated HSCODE model, or a modification to a current model.

The problem associated with multiple goods being contained in one container is a problem difficult to be solved in the current technical conditions. Only a relatively acceptable result can be obtained to some extent. To be accurate, it is influenced by inconsistency between devices and is an ambiguous, complex segmentation problem subjected to supervision by the customs declaration data. For example, for different devices, the forms of the customs declaration data provide a number of supervision values (e.g., the number of types of goods, each type and unit weight, etc.), and each pixel in the image may belong to more than one goods. The complexity also lies in that the forms in which the above factors are present may be different and not accurate. The above problem can be solved by applying a supervised texture image segmentation algorithm.

In order to solve the problems in the conventional solutions, the present disclosure has proposed a solution in which the comparison with a customs declaration is achieved based on HSCODE. The HSCODE model has a hierarchical structure and can be used with a dual (local and cloud) model policy. Further, features can be extracted by means of supervised texture image segmentation and regional texture description. A distance between features can be used as a similarity metric. Also, the HSCODE model can be updated in accordance with a principle of difference maximization, so as to achieve a self-learning function of the system.

The comparison with the customs declaration is performed based on HSCODE. An individual model is created for each HSCODE. From the perspective of HSCODE, the models can be divided into a hierarchical structure of 6-digit, 8-digit and 10-digit. From the perspective of device, the models can be divided into local models and cloud models. It is to be noted that the HSCODE is not mandatory for a customs declaration. For example, a customs declaration may only contain names of goods, without any code. In this case, a typical approach is to parse the names and retrieve texts to obtain corresponding historic images for comparison. Preferably, for a customs declaration without a code, a HSCODE can be obtained based on mapping between names of goods and HSCODEs, so as to find a corresponding model. In order to reduce the influence of the inconsistency between devices, the device-dependent local models can be trained. In absence of local models, the device-independent cloud models can be used. The cloud models are updated continuously and maintain the largest number of models. The local models are independent from the cloud models. They may be the same, or may adopt different algorithms.

A HSCODE goods category can be used as a supervision value for supervised image segmentation. A regional texture description, i.e., feature vector, can be obtained in each segmented region. Feature vectors of a number of historic images are stored in the HSCODE model. A distance between the feature vectors is a similarity. Preferably, the highest similarity between a feature of an unknown sample and the respective vectors (i.e., templates) in the model is the similarity between the sample and the HSCODE. It is to be noted that there are a number of methods for segmenting regions in the image of goods and extracting features. For example, the regions can be segmented by image column clustering and the features can be formed by image feature patches and their statistics.

The above models can have a self-learning function, including online creating and updating. In the present disclosure, the HSCODE models are updated in accordance with a principle of difference maximization. In order to control the models and reduce the influence of inconsistent amounts of samples, the features in each model is referred to as "templates". The number of templates is set to a uniform "number of plates". When the number of templates in the model is smaller than that number, a feature of a new sample is recorded directly as a template. When the number of templates in the model reaches that number, a sample that matches the model is not used as a template, and a weight of the template having the highest similarity with the sample is increased. When a new sample does not match the model, the template having the lowest weight is replaced with the feature vector of the new sample. In this way, the templates in the HSCODE become a set of templates having the maximum difference, so as to support the feature space of the model. It is to be noted that the principle of difference maximization can be achieved by various online learning schemes.

In practice, this solution involves three phases: training, using and online updating. The training phase includes three steps: image normalizing and valid goods region acquisition; valid region feature extraction; and HSCODE model creation. The using phase includes five steps: image normalizing and valid goods region acquisition; supervised image segmentation; model loading; region feature extraction; and feature-model matching. The online updating is to create a new model or update an existing model when the sample is confirmed to conform to the customs declaration.

Figure 3:
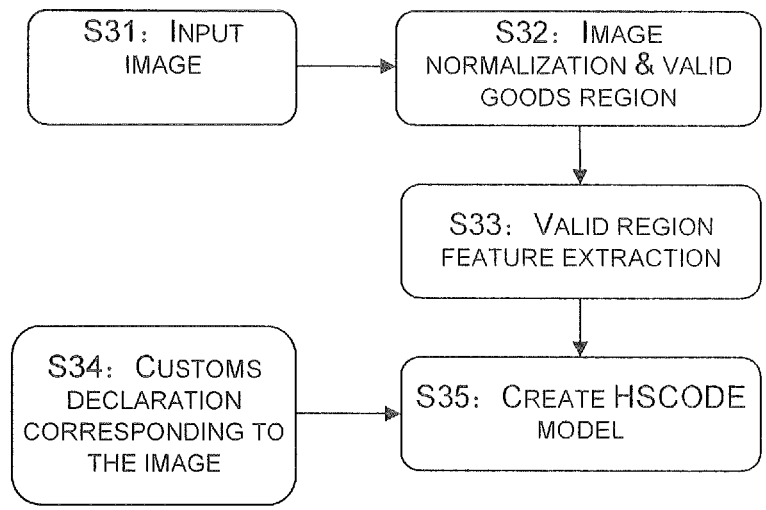
FIG. 3 is a flowchart illustrating a process for creating and training a HSCODE model in a solution according to an embodiment of the present disclosure.

FIG. 3 is a flowchart illustrating a process for creating and training a HSCODE model in a solution according to an embodiment of the present disclosure. As shown in FIG. 3, at step S31, a sample image is obtained. Then, at step 32, the image is normalized and a valid goods region is acquired. In order to extract a region of the goods and reduce influence of inconsistent physical characteristics of the device on the image, first a normalization is achieved by applying image processing operations such as removing attenuations caused by background and air and removing row/column strips. Then, the region of the goods can be obtained by performing operations such as binarization, edge extraction and container edge detection.

At step S33, a valid region feature is extracted. Preferably, texture statistics, particularly texture statistical features based on edge sampling, can be selected to describe a region. For example, i) to emphasize edge information, local region sampling is performed at the edge of the image; ii) to emphasize texture features, the present disclosure adopts texton to extract a multi-scale frequency domain feature from sampling points; and iii) to describe the statistical characteristics of these texture features, a Fisher Vector is used to obtain the final feature vector. Various alternatives to this algorithm can be contemplated by those skilled in the art, e.g., replacing the edge sampling with various corner detection schemes such as HARRIS, replacing texton with descriptions such as SIFT and HOG, using other forms of bags of words, such as Sparse Coding Spatial Pyramid Matching (SCSPM), or obtaining the feature vector by means of Deep Learning, e.g., Regions with CNN features (R-CNN).

It is to be noted that the feature extraction in the training phase is different from that in other phases. First, all the texton features are extracted from the image in an image library. Then, a probabilistic dictionary model required for a Fisher Vector is trained based on all the texton features. After the probabilistic dictionary model has been obtained, the texton features of the respective images are converted into Fisher Vectors. In the using and updating phases, the probabilistic dictionary model is known and the Fisher Vector features can be obtained directly for an inputted image or region. The Fisher Vector is a well-known algorithm and the description thereof will thus be omitted here.

Further, a general training mode involves a batch processing of a large amount of data. In order to ensure the accuracy of the model, among these data, only the image of goods that is considered to be "clear" and contains only one category of goods, i.e., having only one HSCODE, enters the training phase. Otherwise, manual identifications of positions of regions belonging to respective HSCODEs are required for ensuring the accuracy of the training samples.

At step S34, a customs declaration associated with the inputted image is obtained. At step S35, HSCODE models are created. The HSCODE models are divided into local models and cloud models. The cloud models are trained based on a large amount of historic images and provided for use by a user in a form of local files provided within a new product having no historic image. The local models are trained offline after the user has accumulated a large number (e.g., larger than 20,000) of images. The cloud models can be updated either in real time or offline, so as to maintain a set of the largest number of models. While the local models are updated, the cloud models are updated simultaneously. When the local models and the cloud models are both available, the local models are matched first. It can also be configured such that, when there are (enough) local models, only the local models will be used.

Each HSCODE model has a hierarchical structure of 6-digit, 8-digit and 10-digit. The model having the larger number of digits will be matched with a higher priority, i.e., the priority level 10-digit>8-digit>6-digit. Here, the "priority" means that, if a region matches both the 10-digit model A and the 8-digit model B, then the region is considered to belong to the model A.

The forms of the HSCODE depend on the feature extraction algorithm. In an embodiment of the present disclosure, the HSCODE model consists of seven elements, i.e., {device number, HSCODE identifier, maximum number of templates, respective models, weights of the respective templates, unique identifiers of the respective templates in a historic image library, similarity threshold}. The meanings of the respective elements are given below.

Device number: it indicates to which device the model belongs. It is set to "CLOUD" if the model is a cloud model.

HSCODE identifier: it is a HSCODE code, which can be 6, 8, or 10 digits.

Maximum number of templates: it is a value common to all the models, but different devices may have their own maximum numbers of templates for local models. The larger the value is, the better the description of inconsistency between goods will be, but with a reduced rate of accurate inspection. In practice, a good effect can be achieved when the value ranges from 10 to 20.

Respective templates: they are regional texture statistical features of the goods corresponding to the HSCODE. In this embodiment, they can be Fisher Vectors. Their maximum number is the "maximum number of templates" and their dimension can be determined by the probabilistic dictionary model of the Fisher Vectors.

Weights of the respective templates: each template has a weight and the sum of the weights of the respective templates is 1. The higher the weight of a template is, the better the template can represent the HSCODE. The lower the weight of a template, the higher the probability that the template will be replaced by a new sample.

Unique identifiers of the respective templates in a historic image library: each template originates from a real image. While its feature is recorded in the model, its unique identifier, e.g., an index or a manifest, is also recorded. An application can find historic images corresponding to the identifier.

Similarity threshold: if a distance between a feature and a template is larger than or equal to this threshold, they match each other; or otherwise they do not match. This value may originate from a default value, a user defined value, or an adaptive threshold which is adjusted, after initialization, as the model is updated. Its example will be described later.

After obtaining the Fisher Vectors for the respective known HSCODEs in the step S33, if the number of features is smaller than the predetermined maximum number of templates, the features are assigned with the same weight and are recorded in the HSCODE model along with other necessary information. If the number of features is larger than the predetermined maximum number of templates, a sample space can be formed using various schemes.

Figure 4:
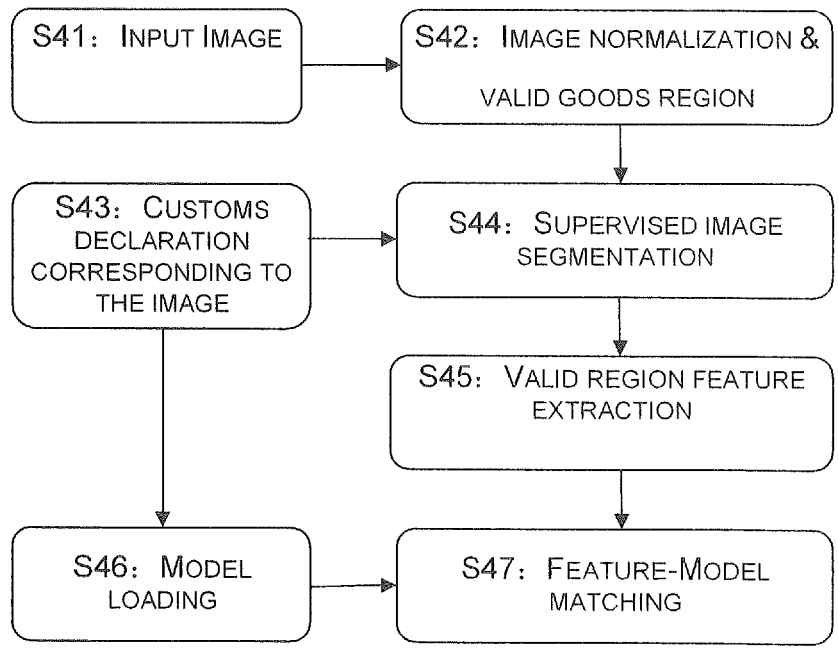
FIG. 4 is a flowchart illustrating a process for inspection using the created model in a solution according to an embodiment of the present disclosure.

FIG. 4 is a flowchart illustrating a process for inspection using the created model in a solution according to an embodiment of the present disclosure.

As shown in FIG. 4, at step S41, an image of inspected goods is inputted. For example, a transmission image of the inspected goods can be obtained using a scanning device. Then, at step S42, the image is normalized and a valid goods region is extracted. For example, in order to extract a region of the goods and reduce influence of inconsistent physical characteristics of the device on the image, first a normalization is achieved by applying image processing operations such as removing attenuations caused by background and air and removing row/column strips. Then, the region of the goods can be obtained by performing operations such as binarization, edge extraction and container edge detection.

At step S43, a customs declaration corresponding to the image is obtained. Then, at step S44, a supervised image segmentation is performed. It differs from a general image segmentation in that the number of goods categories is given in the customs declaration. That is, the category numbers in an ideal image should not exceed the number of goods categories. Hence, regions of different goods can be obtained by applying the supervised image segmentation algorithm. In some embodiments, the segmentation of the image of goods can be achieved by means of texture segmentation.

At step S45, a valid region feature is extracted. This is similar to the step S33 as described above in connection with FIG. 3 and the description thereof will be omitted here. At step S46, a model is loaded. For example, the model can be loaded based on the HSCODE. Since the HSCODE has a hierarchical structure for different devices, there can be various schemes for selecting the models to be loaded. For example, in a "maximum loading mode", all the models matching the first 6, 8 and 10 digits of the number in the local models and the cloud models can be loaded. Alternatively, in a "minimum loading mode", only the model exactly matching the HSCODE number in the local models will be loaded. In some embodiments, the models loaded for the same HSCODE can be sorted in accordance with their priorities.

At step S47, the feature and the model are matched. For example, after obtaining the Fisher Vector feature of an unknown region, a cosine distance is used to measure the distance between the feature and the templates. A larger cosine distance value indicates a higher similarity. In this embodiment, the highest similarity between the respective templates in the model and the feature to be matched is used as the similarity between the templates and the model.

Since in the step S46 the models may have been sorted in accordance with their priorities, in this step the calculation can be stopped once a matched model is found. It is to be noted that, in this step, a "similarity matrix" can be obtained, which is a numeric value matrix having a number of unknown regions as its rows and a number of HSCODEs as its columns. On one hand, one region may match more than one HSCODE. On the other hand, one HSCODE may match more than one region. This is dependent on the ambiguity of the transmission image itself, as well as the performance of the algorithm, such as segmentation and similarity metric.

If a region does not match any of the loaded model, it involves a false or concealed declaration.

Further, in this embodiment, the "unique identifier of the template in a historic image library" is recorded in the HSCODE model and transferred to an application as a matching result. With this identifier, an image having an image region that is most similar to the historic images can be found.

Figure 5:
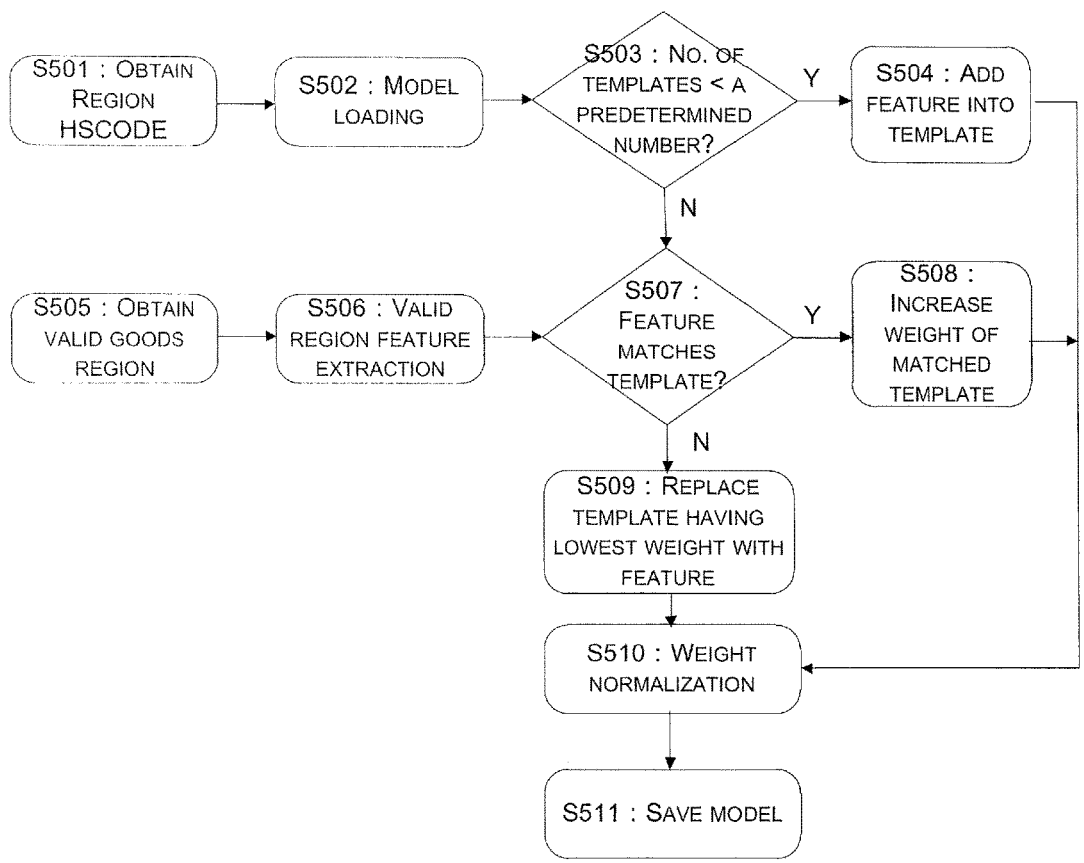
FIG. 5 is a flowchart illustrating a process for updating the created model online in a solution according to an embodiment of the present disclosure.

FIG. 5 is a flowchart illustrating a process for updating the created model online in a solution according to an embodiment of the present disclosure. The updating phase is effectively an online learning process of models and can be achieved by using various online clustering algorithms, e.g., an online K-mean algorithm.

As shown in FIG. 5, at step S501, a region HSCODE is obtained. For example, the input to the online updating includes a HSCODE and an image region. At step S502, a model is loaded. There can be various policies for updating. For example, in a "maximum updating mode", all the models matching the first 6, 8 and 10 digits of the number in the local models and the cloud models can be updated. Alternatively, in a "minimum updating mode", only the model exactly matching the HSCODE number in the local models will be updated.

In the steps S501 and S502, the HSCODE of the image region is obtained and the model is loaded. At steps S505 and S506, a valid goods region is acquired and a feature is extracted from the region. At step S503, if the number of templates in the model is smaller than a predetermined value, at step S504, the feature is directly added as a template. If the number of templates has reached a maximum value, at step S507, a matching step is performed. In case of a match, the weight of the matched template is increased at step S508; or otherwise the template having the lowest weight will be replaced with the feature. Then, at step S510, the weight is normalized and the respective models are saved at step S511.

It is to be noted that there is a special case in such updating where no model exists. In this case, a new model is generated, which includes only one feature having a weight of 1.

Moreover, the updating phase further involves an adaptive adjustment of the threshold. If the matching step has been performed during the updating, all the matched values will be recorded in form of a histogram. This histogram indicates a distribution of scores for all the correct matches. Assuming that any goods having a risk control index of 5% by default require a manual inspection, then the threshold can be adaptively adjusted to a position where the accumulative score distribution reaches 5%, there by achieving an adaptive adjustment of the threshold subjected to risk control.

The above detailed description has already set forth numerous embodiments of the method and systems for inspecting goods with reference to the diagrams, flow charts, and/or examples. In the case where the diagrams, flow charts, and/or examples comprise one or more functions and/or operations, one skilled in the art should appreciate that each function and/or operation in the diagrams, flow charts, or examples may be implemented by various structures, hardware, software, firmware or any combination thereof either alone and/or in any combination. In an embodiment, several parts of the subject matter described in the embodiments of the present disclosure may be implemented by Application Specific Integrated Circuit (ASIC), Field Programmable Gate Array (FPGA), Digital Signal Processor (DSP), or any other integrated form. However, one skilled in the art should appreciate that some aspects of the embodiment disclosed herein may be partially or wholly implemented in an integrated circuit effectively, implemented as one or more computer programs running on one or more computers (for example, one or more programs running on one or more computer systems), implemented as one or more programs running on one or more processors (for example, one or more programs running on one or more microprocessors), implemented as firmware, or substantially any combination thereof, and one skilled in the art is capable to design the circuit and/or write software and/or firmware code. Further, one skilled in the art would appreciate that the mechanism of the subject matter of the present disclosure may be distributed in various forms of program products, and the exemplary embodiments of the subject matter of the present disclosure may be applicable irrespective of the specific types of signal carrier media for distribution. Examples of the signal carrier media comprise but not limited to: a recordable medium such as floppy disk, hard drive, compact disk (CD), digital versatile disk (DVD), digital tape, computer memory, etc.; and a transmission medium, such as digital and/or analog communication medium (for example, optical fiber, waveguide, wired communication link, wireless communication link, etc.)

Although the present disclosure is already described with reference to several typical embodiments, it is to be appreciated that the terms used herein are illustrative and exemplary, rather than limiting. Since the present disclosure may be practice in multiple forms without departing from the spirit or essence, it is to be noted that the above embodiments are not limited to any previously described details and shall be interpreted broadly within the spirit and scope defined by the claims. Therefore, all changes and variations fall into the scope of the claims or their effectives shall be embraced by the claims.

The invention claimed is:

1. A method for inspecting goods comprising the steps of:
obtaining a transmission image and a HSCODE of inspected goods;
processing the transmission image to obtain a region of interest;
retrieving from a model library a model created based on the HSCODE, in accordance with the HSCODE of the inspected goods; and
determining whether there are any goods not registered in a customs declaration that are contained in the region of interest based on the model,
wherein each template in the model comprises a feature vector, and
when the number of templates in the model is smaller than a predetermined number, a feature vector of a new sample is recorded directly as a template, or
when the number of templates in the model reaches the predetermined number, a feature vector of a new sample that matches the model is not used as a template, and a weight of the template having the highest similarity with the sample is increased, or when a feature vector of a new sample does not match any template in the model, the template having the lowest weight is replaced with the feature vector of the new sample.

2. The method of claim 1, wherein the step of processing the transmission image to obtain the region of interest comprises:
applying a supervised image segmentation to the transmission image, with a category of goods represented by the HSCODE of the inspected goods as a supervision value, to obtain at least one segmented region as the region of interest.

3. The method of claim 2, wherein the step of determining whether there are any goods not registered in the customs declaration that are contained in the region of interest based on the model comprises:
obtaining a texture description of each segmented region by applying a feature extraction to the segmented region, so as to form a feature vector;
determining whether a similarity between the feature vector of each segmented region and respective templates included in the model is larger than a threshold; and
determining that there are goods not registered in the customs declaration that are contained in the inspected goods when the similarity between the feature vector of at least one segmented region and the respective templates included in the model is not larger than the threshold.

4. The method of claim 3, wherein the step of retrieving from the model library the model created based on the HSCODE in accordance with the HSCODE of the inspected goods comprises:
retrieving, from a local model library and/or a cloud model library, all models corresponding to front predetermined bits of the HSCODE.

5. The method of claim 4, further comprising the steps of:
sorting the retrieved models in an order;
determining whether there are any goods not registered in the customs declaration that are contained in the region of interest in the order; and
determining that there are goods not registered in the customs declaration that are contained in the inspected goods when the similarity between the feature vector of at least one segmented region and the templates of at least one of the models is not larger than the threshold.

6. The method of claim 3, further comprising the steps of:
updating all models corresponding to front predetermined bits of the HSCODE in a local model library and/or a cloud model library.

7. The method of claim 3, further comprising the steps of:
performing local region sampling at an edge of the image; and
extracting a multi-scale frequency domain feature from sampling points,
wherein the feature vector is obtained from the multi-scale frequency domain feature.

8. The method of claim 1, wherein, when the customs declaration does not include the HSCODE, the HSCODE of the goods is determined based on a name of goods indicated in the customs declaration.

9. The method of claim 1, wherein the model comprises at least the following information: a device identifier, a HSCODE identifier, a maximum number of templates, respective templates, weights of the respective templates, unique identifiers of the respective templates in a historic image library, and a similarity threshold.

10. A system for inspecting goods comprising:
a scanning device configured to obtain a transmission image and a HSCODE of inspected goods; and
a data processing device configured to:
process the transmission image to obtain a region of interest;
retrieve from a model library a model created based on the HSCODE, in accordance with the HSCODE of the inspected goods; and
determine whether there are any goods not registered in a customs declaration that are contained in the region of interest based on the model,
wherein each template in the model comprises a feature vector, and
when the number of templates in the model is smaller than a predetermined number, a feature vector of a new sample is recorded directly as a template, or
when the number of templates in the model reaches the predetermined number, a feature vector of a new sample that matches the model is not used as a template, and a weight of the template having the highest similarity with the sample is increased, or when a feature vector of a new sample does not match any template in the model, the template having the lowest weight is replaced with the feature vector of the new sample.

11. A non-transitory computer-readable medium comprising computer-executable instructions for causing one or more processors and/or memory to perform a method comprising the steps of:
- obtaining a transmission image and a HSCODE of inspected goods;
- processing the transmission image to obtain a region of interest;
- retrieving from a model library a model created based on the HSCODE, in accordance with the HSCODE of the inspected goods; and
- determining whether there are any goods not registered in a customs declaration that are contained in the region of interest based on the model,
- wherein each template in the model comprises a feature vector, and
- when the number of templates in the model is smaller than a predetermined number, a feature vector of a new sample is recorded directly as a template, or
- when the number of templates in the model reaches the predetermined number, a feature vector of a new sample that matches the model is not used as a template, and a weight of the template having the highest similarity with the sample is increased, or when a feature vector of a new sample does not match any template in the model, the template having the lowest weight is replaced with the feature vector of the new sample.

* * * * *